June 24, 1969    F. A. DOLLINGER    3,451,427
ARTICULATED PIPE BOOM STRUCTURE
Filed Aug. 26, 1965    Sheet 1 of 2

INVENTOR.
Francis A. Dollinger
BY Hill, Sherman, Meroni, Gross & Simpson
ATTORNEYS

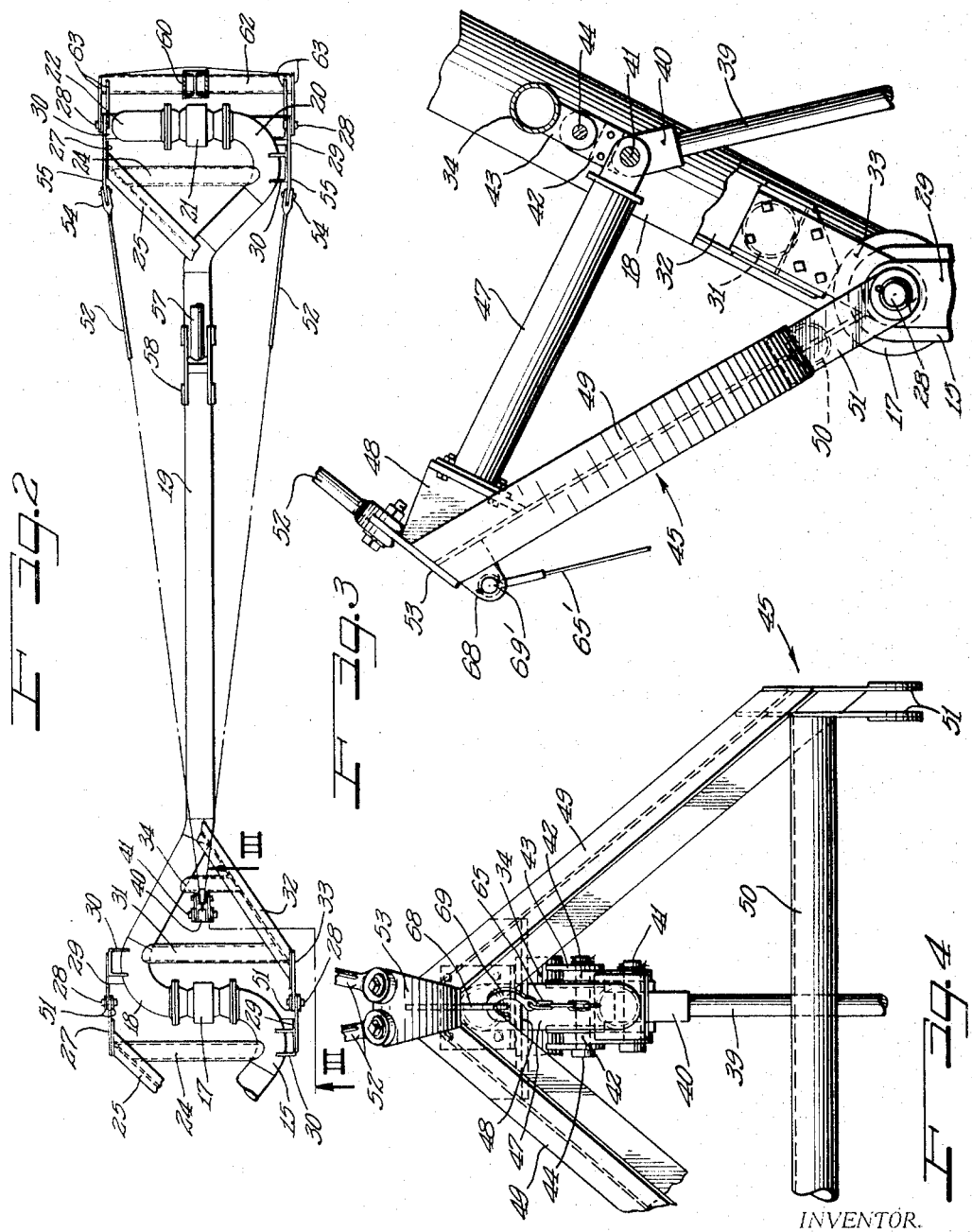

United States Patent Office 3,451,427
Patented June 24, 1969

3,451,427
ARTICULATED PIPE BOOM STRUCTURE
Francis A. Dollinger, Oak Park, Ill., assignor to Mississippi Valley Structural Steel Company, Chicago, Ill., a corporation of Illinois
Filed Aug. 26, 1965, Ser. No. 482,667
Int. Cl. E03b 5/00; F16l 3/14
U.S. Cl. 137—615                               8 Claims

ABSTRACT OF THE DISCLOSURE

A pipe boom construction includes a mast head having a gooseneck pipe yoke and a pipe boom arm having an inboard gooseneck pipe yoke with a swivel joint coupling the yokes on a horizontal axis. An arm-actuating motor generally underlies the inboard yoke and has a thrust member extending in arm-raising thrusting relation toward the inboard yoke, and a flexible connection operatively attaches the thrust member to the inboard yoke. A pylon connected to the thrust member, and also connected to the inboard yoke through the flexible connection, is connected by frame arms in load distribution to journal flange plates of the swivel joint and is also connected by tension rods to journal flange plates of bearing means of a swivel joint connecting the boom arm with an outboard boom arm. A releasable locking member is attached to the upper end portion of the pylon to retain the boom assembly in a raised inactive position.

---

This invention relates to improvements in articulated pipe boom structures, and is more particularly concerned with novel means for more efficiently actuating boom arms of substantial length.

Fluent materials are desirably transferred between loading docks and piers and cargo vehicles, such as trucks, railway cars and marine vessels including tankers and barges, by means of pipe boom assemblies which comprise a plurality of pipe sections coupled in relatively pivotal, swivelly adjustable relation. In such assemblies a vertical swivelly mounted riser pipe has pivotally coupled to its head end a boom arm which may be twenty or more feet in length and which may have pivotally connected to its outboard end another such pipe arm. The dead weight of the boom arm arrangement itself poses a substantial problem in respect to stresses and strains incident to forceful manipulation, relative mobility of the dock and vehicle such as the rise, fall, drift, pitch and roll of a vessel relative to fixed dockage and pier structures, expansion and contraction, wind pressure, and the like.

An important object of the present invention is to provide new and improved means for actuating a pipe boom structure of the character described.

Another object of the invention is to provide improved means for actuating a pipe boom assembly.

A further object of the invention is to provide new and improved means for connecting a boom arm to the piston rod of a hydraulic actuator to avoid binding stresses or strains in any relative position to which the boom arm is actuated.

Still another object of the invention is to provide improved means to compensate or countervail bending and torque loads to which the boom may be subjected.

It is also an object of the invention to provide new and improved means for securing the boom in an inactive position relative to the riser.

Other objects, features and advantages of the present invention will be readily apparent from the following detailed description of a preferred embodiment thereof, taken on conjunction with the accompanying drawings, in which:

FIGURE 2 is a sectional elevational view taken substantially along the line II—II of FIGURE 1;

FIGURE 3 is an enlarged fragmentary section and elevational view taken substantially along the line III—III of FIGURE 2; and FIGURE 4 is a fragmentary rear elevational view of the bridle structure of FIGURE 3.

Figure 1:
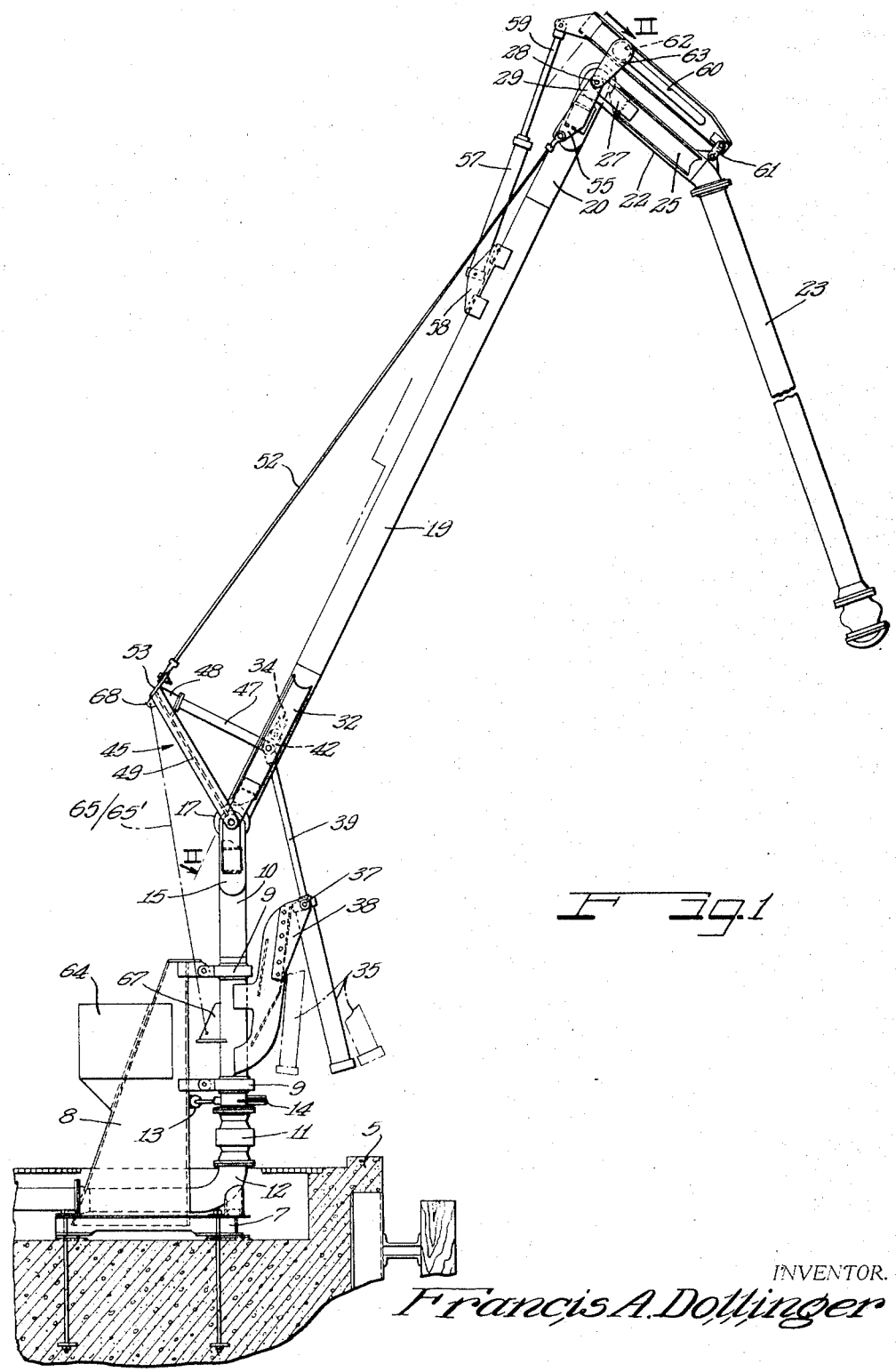
FIGURE 1 is a side elevational view of an articulated pipe or conduit boom assembly embodying features of the invention.

In FIGURE 1 is shown a representative articulated pipe boom assembly embodying features of the invention and of the type which is especially suitable for loading or unloading fluent material between a loading or unloading station and a vehicle. In this instance the assembly is shown as mounted on a marine shipping dock or pier 5 to facilitate transfer of fluent material such as oil with respect to a bulk cargo vessel or tanker. For this purpose the assembly comprises a mounting base 7 anchored to the dock and supporting an upstanding standard structure 8 to which are attached vertically spaced bearing assemblies 9 which pivotally support for the swivel movement a vertical riser pipe 10. At its lower end the riser 10 is connected by a swivel coupling 11 with a stationary elbow pipe 12 leading to a delivery or receiving point, as the case may be. Swivelling actuation of the riser 10 is effected through suitable means such as a hydraulic motor or actuator 13 mounted on the standard 8 and operatively connected to the riser as by means of a crank arm 14 rigid thereon.

Above the uppermost of the bearings 9, the riser 10 has a mast head 15 comprising a gooseneck yoke complementary to and connected by means of a swivel coupling 17 to an inboard gooseneck yoke 18 of a pipe boom member 19. On its outboard end the boom 19 has a gooseneck yoke 20 connected by a swivel joint coupling 21 to a complementary gooseneck yoke 22 on the inboard end of an outboard type boom arm 23. Through this arrangement the boom assembly has a wide range of adaptability in service by the ability of the vertical riser or column 10 to swivel about a vertical axis while each of the inboard boom arm 19 and the outboard boom arm 23 is adapted to swing relative to the other arm and to the riser about a respective horizontal pivot for extending, retracting, raising and lowering of the outer terminal end of the outboard boom arm 23.

To relieve the respective swivel coupling joints 17 and 21 from damaging strains or loads for leakproof and free-swivelling functioning, rigid equalizer frames are mounted on the inner or hook sides of the gooseneck yokes. If respect to the yokes 15, 20 and 22 each of the equalizer frames comprises a generally triangular arrangement of frame bars comprising a bar 24 having its inner end rigidly secured in the inside of the hook-shaped portion of the associated yoke and extending parallel to the pivotal axis of the yoke couplings with its outer end rigidly attached to a diagonal frame bar 25 secured rigidly at its inner end to the base of the yoke and having attached to its outer end a journal flange plate 27 which extends across the swivel joint coupling axis and is pivotally connected by a pivot bearing pin 28 on said axis to a complementary journal flange plate 29 of a journal bracket 30 rigidly mounted on the outer or shoulder side of the gooseneck yoke companion to that on which the respective equalizer frame is mounted.

In respect to the inboard gooseneck yoke 18, a similar but somewhat modified rigid equalizer frame is provided including a frame bar 31 which is parallel to the swivel axis of the joint 17, has its inner end rigidly attached to the inside or hook portion of the yoke 18 and has its outer end rigidly connected to the outer end portion of a diagonal brace bar 32 which is, in this instance, slightly longer than the corresponding diagonal brace bars 25 and has its inner end rigidly attached to the base of the gooseneck 18 and carries on its outer end a journal flange plate 33 extending across the swivel joint axis and coupled by the associated bearing pin 28 to the interleaved journal bracket plate flange 29 of the yoke 15. In addition, the equalizer frame for the yoke 18 has a reinforcing bar 34 extending between and rigid with the yoke member 18 and the diagonal brace bar 32 in spaced parallel relation to the frame bar 31. This affords excellent reinforcement and rigidity for the inboard yoke 18 to withstand strong thrust loads in service.

According to the present invention, the boom arm assembly is raised or lowered by means of a hydraulic cylinder motor 35 suitably located under the inboard yoke 18 and mounted for oscillation about a horizontal axis 37 on a supporting bracket 38 which is carried rigidly by the riser 10 between the bearings 9. Projecting upwardly from the cylinder motor is a piston rod 39 by which raising and lowering actuation of the inboard boom arm 19 is effected and hydraulic support of the boom arm is enabled in any selected position between opposite limits indicated schematically by dot-dash and dash outline positions in FIGURE 1.

A freely acting bind-free operative connection between the outer end portion of the piston rod 39 and the boom arm 19 is afforded by short link connection with the equalizer bar 34 in the vertical plane through the axis of the boom arm 19. To this end, the upper end of the piston rod 39 carries a journal block 40 which is connected by bearing means such as a pivot pin 41 to one or more, preferably two, identical link members 42 to the bar 34 as by rigid jouranl boss means 43 on the bar to which the link means are connected by bearing means such as a pivot pin 44.

For load distribution and stabilization, means are provided for connecting the piston rod not only to the yoke 18 but also to the associated bearings 28 and to the outboard yoke 20 and its associated bearings 28. For this purpose, a bridle structure 45 is mounted in association with the inboard yoke 18 and includes a thrust column 47 having one end pivotally attached in thrusting relation to the piston rod journal block 40 by means of the pivot pin 41. From this pivotal thrusting connection with the piston rod, the thrust column 47 extends generally normal to a horizontal plane through the axis of the inboard boom arm 19 away from the piston rod and is rigidly attached at its opposite end to a rigid bracket structure 48 on the upper end portion of a pylon A-frame comprising rigid frame bar arms 49 which diverge from the bracket and are rigidly attached at their spread apart end portions to a transverse rigid stabilizer bar 50 having rigidly secured to its opposite ends and to the attached ends of the frame arms 49 respective pairs of spaced apart coextensive bearing bracket journal flange plates 51 interleaved with the journal flange plates 27 and 29 on one side of the pivot yoke assembly and with the journal flange plates 29 and 33 on the other side of the assembly and secured pivotally therewith by the pivot bearing pins 28.

Means are provided for securing the top of the pylon structure in load supporting relation to the outboard end assembly on the inboard boom arm 19. For this purpose a pair of guy or tension rods 52 which are anchored at inboard ends thereof to an anchor plate 53 which is rigid on top of the pylon. From this inboard anchorage, which is substantially opposite the connecting link means 42, the tension rods 52 extend divergently in the outboard direction and diagonally from the top of the pylon toward a plane across the top of the outboard yoke 20 and the equalizer frame thereof. At their outboard ends, the tension rods 52 are secured as by means of respective clevises 54 to respective inboard extensions 55 integral with the journal plates 27 and 29 which are rigid with the outboard yoke 20, Through this arrangement, not only do the tension rods 52 compensate bending loads on the inboard boom arm 19, but efficiently balance torque loads imposed on the outboard coupling assembly of the inboard boom arm. In addition, the thrust and cantilever loads resulting from the actuating motor rod 39 attached to the inboard yoke 18 are spread and equalized over the boom assembly and to the mast head yoke 15. By virtue of the flexible connection afforded by the connecting link structure 42, substantially bind-free operation is attained in the presence of system resiliencies, deadload deformations contraction and expansion, and the like.

Desirably, means are provided for swively actuating the outboard boom arm 23 relative to the inboard boom arm 19. For this purpose a suitable actuating motor such as a hydraulic cylinder 57 is pivotally anchored at one end by bracket means 58 to the outboard end portion of the inboard boom member 19 inboard from the yoke 20. A piston rod 59 from the motor 57 is attached at its outer end pivotally to the inboard end portion of an actuating bridle lever 60 secured at its outboard end by means such as a link 61 to the inboard end portion of the outboard boom arm 23. A stabilizer frame transverse bar 62, rigid with the actuating lever 60, has coextensive journal plates 63 at its opposite ends interleaved with the associated journal plates 29 and 27 and not only stabilizes the bearings 28 but also provides a fulcrum for the actuating lever.

A suitable hydraulic control system in which the actuating motors 35 and 57 may be integrated may be according to that exemplified in Patent 2,984,985 dated Feb. 23, 1961. A power control unit console 64 may be mounted on the standard 8.

For locking the assembly in non-operating condition with the inboard boom arm 19 raised, an elongated locking member conveniently comprising a latching or locking chain 65 (FIGURES 1 and 4), but which may also be in the form of a locking rod or bar strut 65' (FIGURES 1 and 3), is provided to be connected between an anchor bracket 67 on the riser 10, preferably generally opposite to the motor mounting bracket 38, and an anchoring ear 68 rigid with the pylon bracket 48. Attachment of the locking member 65 to the bracket 67 and the ear 68, or at least to the ear 68 may be effected by releasable means such as a hook 69 (FIGURE 4) or a pin and clevis assembly 69' (FIG. 3). Through this arrangement, during idle time when the hydraulic system may be shut down for servicing, for example, the boom is adapted to be locked in the inactivated condition with the inboard arm 19 substantially in the elevated position shown in FIGURE 1 even though the hydraulic pressure in the system may be at zero.

It will be understood that modifications and variations may be effected without departing from the scope of the novel concepts of the present invention.

I claim as my invention:
1. A pipe boom construction of the character described affording a conduit system and comprising:
a supporting structure and a riser pipe supported thereby which has a head gooseneck pipe yoke, an inboard pipe boom arm having an inboard gooseneck pipe yoke swivelly coupled on an inboard horizontal axis for up and down swinging movement of the inboard arm,
an outboard gooseneck pipe yoke on said inboard arm, an outboard pipe boom arm having a gooseneck pipe yoke swivelly coupled withe said outboard yoke on an outboard horizontal axis,
equalizer structure on each of said yokes pivotally connected with the equalizer structure of the yoke with which swivelly connected and on the axis of the swivel connection,
said equalizer structure of said outboard yoke including journal members,
a hydraulic actuating motor comprising a piston mounted on said riser and having an actuating piston rod projecting toward said inboard yoke, a link connecting said piston rod to said equalizer structure of said inboard yoke, a combination stabilizer frame and pylon pivotally mounted on said inboard axis and having a thrust column attached to the upper end portion of the pylon and to said link and said rod, and a pair of tension members attached to said pylon and to said journal members.

2. In combination in a conveyor pipe boom assembly of the character described, an upright riser pipe having a mast head gooseneck yoke, an inboard pipe arm having an inboard gooseneck swivelly coupled with said head yoke on a horizontal axis, power means for raising and lowering said boom arm about said axis, a frame structure mounted on said axis for movement with said boom arm in its up and downswinging movements and including a pylon extending upwardly relative to said head yoke, an outboard gooseneck pipe yoke on said boom arm, an outboard boom pipe member having a gooseneck pipe yoke coupled on a swivel joint with said outboard yoke on a horizontal axis, stabilizer means on said outboard yoke and said outboard boom member yoke and including journal members pivotally connected and located at respectively the outer side of said outboard yoke and said outboard member yoke and on their coupling joint axis, and a pair of tension members attached at one end to said pylon and at their opposite ends to respective ones of said journal members.

3. In a conveyor duct system comprising a pipe boom having an inboard gooseneck pipe yoke coupled to a head gooseneck pipe yoke on a first horizontal axis and an outboard gooseneck pipe yoke coupled to an outboard pipe arm and on a second horizontal axis and including bearings at the respective opposite sides of said outboard gooseneck, and a pylon structure mounted on and over said inboard yoke above said first axis:

the improvement comprising a pair of tension members having inboard ends secured to said pylon structure adjacent to a vertical plane through the longitudinal axis of said pipe boom and diverging therefrom and having outboard ends respectively attached to opposite sides of said outboard gooseneck contiguous to said bearings and substantially spaced from said plane.

4. In a pipe boom construction including a mast head gooseneck pipe yoke and a pipe boom arm having an inboard gooseneck pipe yoke with a swivel joint coupling said yokes on a horizontal axis, an outboard gooseneck pipe yoke on said arm, an outboard pipe boom arm having an inboard gooseneck pipe yoke with a swivel joint coupling it to said outboard gooseneck pipe yoke.

equalizer frame means on all of said gooseneck pipe yokes and said gooseneck pipe yokes and the equalizer frame means having respective bearings on the respective axis of the respective associated swivel joint coupling, a boom arm actuating motor generally underlying said inboard yoke and having a thrust member extending toward said inboard yoke, means operatively attaching said thrust member to said inboard yoke, a stabilizer frame pivotally mounted on said bearings axially aligned with the swivel joint coupling of the mast head and inboard yokes and including loading structure connected to said thrust member and to said bearings and respectively aligned with said swivel joint couplings of the outboard yoke and of the yoke of the outboard boom arm, and said loading structure comprising a pylon having a thrust column which is attached to said thrust member, and tension rod means connected to one end of said pylon and at the opposite end of said bearings aligned with the outboard swivel joint coupling.

5. A pipe boom construction as defined in claim 4, in which said stabilizer frame and pylon comprise a substantially A-frame upstanding relative to said mast head with rigid bracket and coupling structure on its upper end from which said column projects rigidly toward said thrust member and to which said tension rod means are anchored.

6. A pipe boom construction as defined in claim 5, in which said mast head yoke is supported by a vertical riser pipe, anchor bracket means on respectively said riser pipe and on the upper portion of said pylon adjacent to said bracket and anchor means, and a member releasably connectable between said anchor bracket means for locking said inboard boom arm in an inactive raised position.

7. A pipe boom construction of the character described affording a conduit system and comprising:

a supporting structure and a riser pipe supported thereby which has a head gooseneck pipe yoke, a pipe boom arm having an inboard gooseneck pipe yoke swivelly coupled on an inboard horizontal axis for up and down swinging movement of said arm, equalizer structure on each of said yokes pivotally connected with the equalizer structure of the yoke with which it is swivelly connected and on the axis of the swivel connection, said equalizer structure of said outboard yoke including journal members, a hydraulic actuating motor comprising a piston mounted on said riser on the side facing in the direction of extension of said boom arm and having an actuating piston rod projecting toward said inboard yoke, and said piston rod normally in compression, a journal block attached to the upper end of said piston rod, a link connecting said journal block of said piston rod to said equalizer structure of said inboard yoke, and a combination stabilizer frame and pylon pivotally mounted on said inboard axis and having a thrust column attached to the upper end portion of the pylon and to said link and said rod.

8. A pipe boom construction according to claim 7 comprising a second link connecting said journal block to said piston rod to said equalizer structure of said inboard yoke.

References Cited

UNITED STATES PATENTS

| | | | |
|---|---|---|---|
| 1,732,047 | 10/1929 | Holmes | 212—58 |
| 2,382,767 | 8/1945 | Zeilman | 212—144 |
| 3,126,913 | 3/1964 | Green | 137—615 |
| 3,217,748 | 11/1965 | Harper | 137—615 |
| 3,221,772 | 12/1965 | Arntzen | 137—615 |

ALAN COHAN, *Primary Examiner.*

H. M. COHN, *Assistant Examiner.*

U.S. Cl. X.R.

212—58, 144